US011875985B2

(12) United States Patent
Gorkhover et al.

(10) Patent No.: US 11,875,985 B2
(45) Date of Patent: Jan. 16, 2024

(54) MASS SPECTROMETER COMPRISING AN IONIZATION DEVICE

(71) Applicant: Leybold GmbH, Cologne (DE)

(72) Inventors: Leonid Gorkhover, Ulm (DE); Gennady Fedosenko, Aalen (DE); Alexander Laue, Heidenheim (DE); Rudiger Reuter, Essen (DE); Hin Yiu Anthony Chung, Ulm (DE)

(73) Assignee: Leybold GmbH, Cologne (DE)

( * ) Notice: Subject to any disclaimer, the term of this patent is extended or adjusted under 35 U.S.C. 154(b) by 76 days.

(21) Appl. No.: 17/600,689

(22) PCT Filed: Mar. 20, 2020

(86) PCT No.: PCT/EP2020/057739
§ 371 (c)(1),
(2) Date: Oct. 1, 2021

(87) PCT Pub. No.: WO2020/200833
PCT Pub. Date: Oct. 8, 2020

(65) Prior Publication Data
US 2022/0172941 A1 Jun. 2, 2022

(30) Foreign Application Priority Data
Apr. 2, 2019 (DE) ..................... 10 2019 204 694.0

(51) Int. Cl.
*H01J 49/42* (2006.01)
*H01J 49/04* (2006.01)
*H01J 49/10* (2006.01)

(52) U.S. Cl.
CPC ........ *H01J 49/424* (2013.01); *H01J 49/0495* (2013.01); *H01J 49/105* (2013.01)

(58) Field of Classification Search
CPC .... H01J 49/022; H01J 49/0495; H01J 49/105; H01J 49/424
See application file for complete search history.

(56) References Cited

U.S. PATENT DOCUMENTS 9,093,253 B2 * 7/2015 Bartfay-Szabo .... H01J 49/0022
9,099,286 B2 * 8/2015 Brown ................ H01J 49/0031
(Continued)

FOREIGN PATENT DOCUMENTS

CN 108538700 A 9/2018
DE 102012200211 A1 7/2013
(Continued)

OTHER PUBLICATIONS

German Office Action dated Nov. 27, 2019 for corresponding German application Serial No. 102019204694.0, 5 pages.
(Continued)

*Primary Examiner* — David E Smith
(74) *Attorney, Agent, or Firm* — Theodore M. Magee; Westman, Champlin & Koehler, P.A.

(57) ABSTRACT

A mass spectrometer includes an ion trap, which has an interior for storing ions, a signal generator, which is connected to an electrode of the ion trap, which delimits the interior, for coupling in a voltage signal, in particular a radiofrequency voltage signal, and an ionization device for ionizing a gas to be ionized and supplied to the interior. The ionization device is connected to the signal generator in order to use the voltage signal ($U_{RF}$, $U_{Stim1}$, $U_{stim2}$) of the signal generator, which is coupled into the electrode, for generating ions.

13 Claims, 2 Drawing Sheets

(56) References Cited

U.S. PATENT DOCUMENTS

| | | | |
|---|---|---|---|
| 2005/0061966 | A1 | 3/2005 | Ding et al. |
| 2016/0111269 | A1 | 4/2016 | Fedosenko et al. |

FOREIGN PATENT DOCUMENTS

| | | | | | |
|---|---|---|---|---|---|
| DE | 102013208959 | A1 | | 11/2014 | |
| JP | H08203468 | A | | 8/1996 | |
| WO | 2014105089 | A1 | | 7/2014 | |
| WO | WO-2014105089 | A1 | * | 7/2014 | .......... H01J 49/0013 |
| WO | 2014118122 | A2 | | 8/2014 | |
| WO | 2016096457 | A1 | | 6/2016 | |
| WO | 2017194333 | A1 | | 11/2017 | |

OTHER PUBLICATIONS

PCT International Search Report dated Jun. 23, 2020 for corresponding PCT application No. PCT/EP2020/057739, 3 pages.
PCT Written Opinion dated Jun. 23, 2020 for corresponding PCT application No. PCT/EP2020/057739, 6 pages.
Chinese First Office Action dated Jul. 4, 2023 for corresponding Chinese application Serial No. 202080040873.9., 18 pages.

* cited by examiner

MASS SPECTROMETER COMPRISING AN IONIZATION DEVICE

CROSS-REFERENCE TO RELATED APPLICATION

This application is a Section 371 National Stage Application of International Application No. PCT/EP2020/057739, filed Mar. 20, 2020, and published as WO 2020/200833A1 on Oct. 8, 2020, which claims priority to German Patent Application 10 2019 204 694.0 filed Apr. 2, 2019, the entire disclosure of which is considered part of and is incorporated by reference in the disclosure of this application.

BACKGROUND

Various ionization methods can be applied for ionizing a gas or a gas mixture for the detection in a mass spectrometer. By way of example, the ionization can be implemented by electron impact ionization, by means of a hot filament, by field ionization, by way of an ionization by means of a pulsed laser, by photon ionization, by ionization by means of a plasma, etc. The realization of all these ionization processes requires the supply of power to the respective ionization device for carrying out the ionization.

Mass spectrometers where the gas to be analysed is ionized by a plasma outside of the detector have various additional devices such as differentially pumped ion transfer stages, skimmers or the like present between the ion source or the plasma ionization device and the detector in order, firstly, to transmit the ions into the detector and, secondly, to ensure a higher gas pressure in the plasma ionization device and a lower gas pressure in the detector. The plasma ionization device is spatially separated from the detector by these additional devices. Alternatively, a detector could also be operated in a higher pressure range; however, this reduces the capability, in particular the sensitivity, thereof.

For plasma ionization, the plasma ionization device is typically supplied with a voltage from an external voltage source. As a rule, the plasma ionization device has at least two electrodes and a plasma chamber in order to ignite the plasma. Accordingly, the plasma ionization device requires a comparatively large installation space and represents an additional component of the mass spectrometer.

WO 2014/118122 A2 has disclosed a mass spectrometer which comprises an ionization unit for ionizing a gas mixture and a detector for detecting the ionized gas mixture. The ionization unit may have a plasma ionization device, which is embodied to ionize the gas mixture to be detected by generating a plasma before said gas mixture is supplied to a detector, e.g., an ion trap. Alternatively, the gas mixture could also be introduced directly, i.e., without a preceding ionization, into the detector (e.g., in the form of an ion trap). In this case, ions and/or metastable particles of an ionization gas could be supplied to the detector in order to ionize the gas mixture in the detector by way of an impact or charge exchange ionization. The ions and/or metastable particles of the ionization gas can likewise be ionized with the aid of a plasma ionization device.

WO 2016/096457 A1 describes an ionization device and a mass spectrometer with such an ionization device. The ionization device comprises a plasma generating device for generating metastable particles and/or ions of an ionization gas in a primary plasma region, a field generating device for generating a glow discharge in a secondary plasma region, an inlet for supplying a gas to be ionized into the secondary plasma region, and a further inlet for supplying the metastable particles and/or the ions of the ionization gas into the secondary plasma region.

WO 2017/194333 A1 describes a mass spectrometer for detecting ions, comprising: an ion trap having at least one first electrode, for example a ring electrode, and also having at least one second electrode, for example a cap electrode, a storage signal generator for generating an RF storage signal, which is couplable into the first electrode in order to generate an electric storage field in the ion trap, an excitation device for generating an excitation signal for exciting ions stored in the ion trap, and also a detector for detecting an ion signal generated by the excited ions. The storage signal generator is embodied to set an amplitude and/or a frequency of the RF storage signal.

The discussion above is merely provided for general background information and is not intended to be used as an aid in determining the scope of the claimed subject matter. The claimed subject matter is not limited to implementations that solve any or all disadvantages noted in the background.

SUMMARY

The invention relates to a mass spectrometer, comprising: an ion trap, in particular an electric ion resonance trap, which has an interior for storing ions, a signal generator, which is connected to an electrode of the ion trap, which delimits the interior, for coupling in a voltage signal, in particular a radiofrequency voltage signal, and an ionization device, in particular a plasma ionization device, for ionizing a gas to be ionized and supplied to the interior.

The invention proposes to additionally also use the voltage signal of the signal generator, which is required in any case for storing and/or exciting the ions in the interior of the ion trap, for the ionization of the gas which is to be ionized and supplied to the interior of the ion trap or for the generation of a plasma. This allows an additional power supply to the ionization device, for example in the form of an additional voltage source, to be generally completely dispensed with. It was found that the voltage sources used in conventional ionization devices may lead to interferences, more precisely to interference frequencies in the spectra recorded with the aid of the mass spectrometer. The use of the voltage signal for generating the ions or the plasma also facilitates a compact design of the mass spectrometer, as will be described in more detail below.

Should the voltage signal be an AC voltage, the voltage signal can be applied to two different components, generally two electrodes, of the ionization device in order to generate the ions or a plasma between the two electrodes. Alternatively, the voltage signal can be applied to a first electrode while a second electrode of the ionization device is kept at a constant potential, e.g., at earth potential. In particular, the electrode of the ion trap, which is connected to the signal generator in any case, can form a part or an electrode of the (plasma) ionization device, and so it is possible to save an otherwise additionally required electrode.

In one embodiment, the electrode, which is connected to the signal generator, has a passage opening for the supply of the gas into the interior. It is understood that the gas supplied to the interior of the ion trap must, for the ionization thereof, be guided through the ionization device and optionally through the plasma or at least past the plasma. The provision of the passage opening in the electrode allows a plasma to be ignited directly in front of the ion trap with the aid of the electrode or with the aid of the voltage signal coupled into the electrode and the ionized gas can be guided into the interior directly via the passage opening, and so the necessity of the ion transfer into the ion trap is dispensed with.

In a further embodiment, the mass spectrometer comprises a gas supply, which is embodied to supply a gas in the form of a gas to be analysed or an ionization gas to the ionization device. As described above in the context of WO 2014/118122 A2, the gas mixture or gas to be analysed can be ionized outside of the ion trap in the ionization device and can be supplied to the interior of the ion trap as an ionized gas or in the form of ionized species. In this case, the gas supply is typically connected to a (process) chamber or the like, in which the gas to be analysed is introduced.

Alternatively, the gas to be ionized can be an ionization gas which is introduced into the interior of the ion trap for ionizing the gas to be analysed, as described in WO 2014/118122 A2, which in the entirety thereof is incorporated in this application by reference. In this case, the ionization gas and the gas to be analysed are typically introduced into the interior of the ion trap through two separate inlets. Here, the gas supply typically has a gas reservoir, from which the ionization gas is taken. As a rule, the ionization gas is an inert gas, e.g., helium.

In a development, the gas supply has at least one valve, which is controllable by means of a control device, for the pulsed supply of the gas to the ionization device. The pulsed supply of the gas leads to a variation in the gas pressure of the gas which is supplied to the ionization device and hence also in the gas pressure in the region in which the ions or the plasma should be generated. If the pulse frequency or the variation of the pressure in the ionization device is suitably chosen or set with the aid of the controllable valve, the plasma can be ignited and quenched again on account of the increasing or falling gas pressure within the ionization device, without an open-loop or closed-loop controller being mandatory for this purpose. Therefore, the typically quite complex and hence challenging control of the mass spectrometer can be simplified by this automatism. Additional open-loop or closed-loop control outlay, as occurs in conventional ionization processes, e.g., for closed-loop control of an emission current during the electron beam ionization, can be avoided as a result thereof.

In a further embodiment, the electrode of the ion trap, which is connected to the signal generator, forms a first of at least two electrodes of the ionization device, between which the ions or the plasma are/is generated. As described further above, the electrode of the ion trap, which delimits the interior, is used at the same time as an electrode for generating ions or possibly for plasma generation in this case, and so an electrode can be saved in relation to a conventional ionization device.

In one development, the electrode has a protruding electrode portion, in particular a protruding electrode portion that tapers to a tip, on its side facing away from the interior, in particular in the region of the passage opening. The use of an electrode portion that tapers to a tip can promote the generation of ions since the electric field line density, and hence the electric field strength, is high at the tip. In particular, the protruding electrode portion can be embodied as a tubular continuation of the passage opening. Alternatively, the protruding electrode portion can have an arrangement which is offset from the passage opening on the side of the electrode facing away from the interior and can optionally extend into the region of the passage opening with its end that tapers to a tip.

Instead of a tubular electrode portion that tapers to a tip, a cylindrical electrode portion which extends the passage opening could also be formed on the side of the electrode facing away from the interior. By way of example, this can be advantageous for connecting a tubular supply line to the electrode. For the connection to a tubular supply line, the electrode could also have one or more cutouts in the vicinity of the passage opening and/or the passage opening could have a step to this end.

There are a number of options for configuring the at least one further electrode of the ionization device:

In one development, the ionization device has an electrically conductive supply line, in particular an electrically conductive tubular supply line, which is intended for supplying the gas to the ion trap and which forms the second electrode of the ionization device. The electrically conductive supply line, for example a metallic supply line, can be connected to a constant potential, for example earth potential, or to the signal generator in order to likewise apply the voltage signal there.

In this case, the electrically conductive supply line is spaced apart from the electrode of the ion trap, in which the passage opening is formed, in order to generate the plasma between the two electrodes. In this case, in particular, it is advantageous if the electrode has the above-described electrode portion that tapers to a tip in order to simplify or facilitate the ignition of the plasma. In order to bridge the interstice or the spacing between the supply line and the electrode of the ion trap, use can be made of a portion of a supply line made of an insulating material, for example a ceramic, which envelopes the metallic supply line in the region of the interstice as a type of cladding such that the supplied gas cannot escape into the surroundings.

In an alternative embodiment, the ionization device has a supply line, in particular a tubular supply line, made of an electrically insulating material for supplying the gas and the second electrode of the ionization device is arranged on the outer side of the supply line. In this case, the second electrode can be embodied as a metallic ring or as a metallic tube, for example, which is fastened to the outer side of the supply line. Here, the plasma is ignited by a dielectric barrier discharge; i.e., the second electrode is shielded by the (dielectric) material of the supply line from the space within the supply line in which the gas to be ionized flows. Since substantially only electrons are accelerated in a dielectric discharge, the dielectric discharge facilitates the generation of a cold plasma, which may be advantageous for the present application.

In a further alternative embodiment, the ionization device has a supply line, in particular a tubular supply line, made of an electrically insulating material and the second electrode of the ionization device is arranged within the supply line. In this case, the gas to be ionized flows around the second electrode, at least in part. Arranging the second electrode within the supply line makes it possible to choose a geometry of the second electrode that is advantageous for the generation of the ions or the plasma. However, it should be ensured that the flow of the gas through the supply line is not influenced too strongly by the second electrode. The second electrode can be fastened to the supply line with the aid of an electrode portion that extends through the wall of the tubular supply line. Alternatively, the electrode can be fastened to the inner side of the wall of the supply line and the voltage signal or, optionally, a constant potential can be applied thereto with the aid of an electric line guided in the supply line.

In one development, the second electrode, which is disposed in the supply line, has a tip that faces the first electrode of the ionization device (and the ion trap). By way of example, the tip can protrude into the tubular electrode portion that extends the passage opening, which was described further above. In addition to the second electrode that tapers to a tip, the first electrode can also have a tip in order to generate the ions and/or ignite a plasma between the two tips. In this case, it is advantageous if the electrode portion that tapers to a tip is attached to the electrode with an offset from the passage opening and extends in the direction of the passage opening.

In one embodiment, the signal generator is embodied to couple the voltage signal into a ring electrode of the ion trap for storing the ions in the interior. In this case, the ion trap can be an ion resonance strap, for example, which has at least one ring electrode and generally at least two cap electrodes, which together delimit the interior of the ion trap. In the case of a conventional quadrupole trap in the form of a hyperbolic Paul trap, the ring and cap electrodes each have a substantially hyperbolic geometry. As a rule, the two cap electrodes are at earth potential (when there is no excitation), while a radiofrequency storage voltage signal in the form of a radiofrequency AC voltage is applied to the ring electrode. By virtue of the radiofrequency storage voltage signal, an electric field (quadrupole field) is generated in the ion trap, said electric field also being referred to as an electric storage field, since ions or charged particles in such a field can be stored stably in the ion trap. As described above, the radiofrequency storage voltage signal, which is generated by the signal generator, can be used to generate an RF plasma in the ionization device. The storage voltage signal typically has a frequency lying in the MHz-range, for example of the order of 1 MHz.

In a further embodiment, the signal generator or a (further) signal generator of the mass spectrometer is embodied to couple the voltage signal into at least one cap electrode of the ion trap for exciting the ions in the interior. As an alternative to the storage voltage signal, which is typically coupled into the ring electrode or a ring electrode, an excitation voltage signal, which is coupled into the cap electrode, can also be used to generate the plasma. Typically, such an excitation voltage signal, for example for generating a so-called SWIFT ("Storage Wave-Form Inverse Fourier Transform") excitation, is likewise a radiofrequency AC voltage signal. The excitation voltage signal is typically generated by a dedicated excitation signal generator and is coupled into the cap electrode thereby. The excitation signal can advantageously be used to generate an RF plasma in the (plasma) ionization device. Optionally, the voltage signal or a voltage signal used for excitation purposes can also be coupled into the ring electrode.

In a further embodiment, the mass spectrometer comprises a detector for detecting ions removed from the ion trap or for detecting an ion signal generated by the ions stored (and excited) in the ion trap. Mass spectrometers on the basis of an electric ion resonance cell are usually operated in the so-called "instability mode", in which stored ions are removed from the ion trap in a targeted manner (by way of an over-excitation) and detected by a (particle) detector.

Alternatively, the ions stored in the ion trap can be detected in non-destructive fashion by virtue of an ion signal generated during the excitation of the ions being detected. In this case, the ions are detected by measuring or detecting induced charges on the cap electrode or cap electrodes of the ion trap. In order to generate the induced charges, the ions are excited to oscillate by an excitation signal, the frequency of which oscillations is dependent on the ion mass or dependent on the mass-to-charge ratio of the excited ions, and so the latter can be detected on the basis of the ion current or ion signal generated at the cap electrodes. The induced charges or the ion current signal is/are typically measured by virtue of the ion current or a voltage ion signal proportional thereto being recorded and being converted into a frequency spectrum or into a mass spectrum in a spectrometer by means of a Fourier transform. On account of this conversion, such a mass spectrometer is also referred to as an (electric) Fourier transform ion cyclotron resonance (FT-ICR) mass spectrometer.

It is understood that the inventive use of the voltage signal for generating the ions or the plasma in the ionization device need not necessarily be applied to the types of ion trap described further above but that, in principle, this can also be carried out in other types of ion trap that have at least one electrode, into which a voltage signal is coupled.

Further features and advantages of the invention are evident from the following description of exemplary embodiments of the invention, with reference to the figures of the drawing, which show details essential to the invention, and from the claims. The individual features can be realized in each case individually by themselves or as a plurality in any desired combination in a variant of the invention.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

Exemplary embodiments are illustrated in the schematic drawing and are explained in the following description. In the figures.

DETAILED DESCRIPTION

In the following description of the drawings, identical reference signs are used for identical or functionally identical components, respectively.

Figure 1:
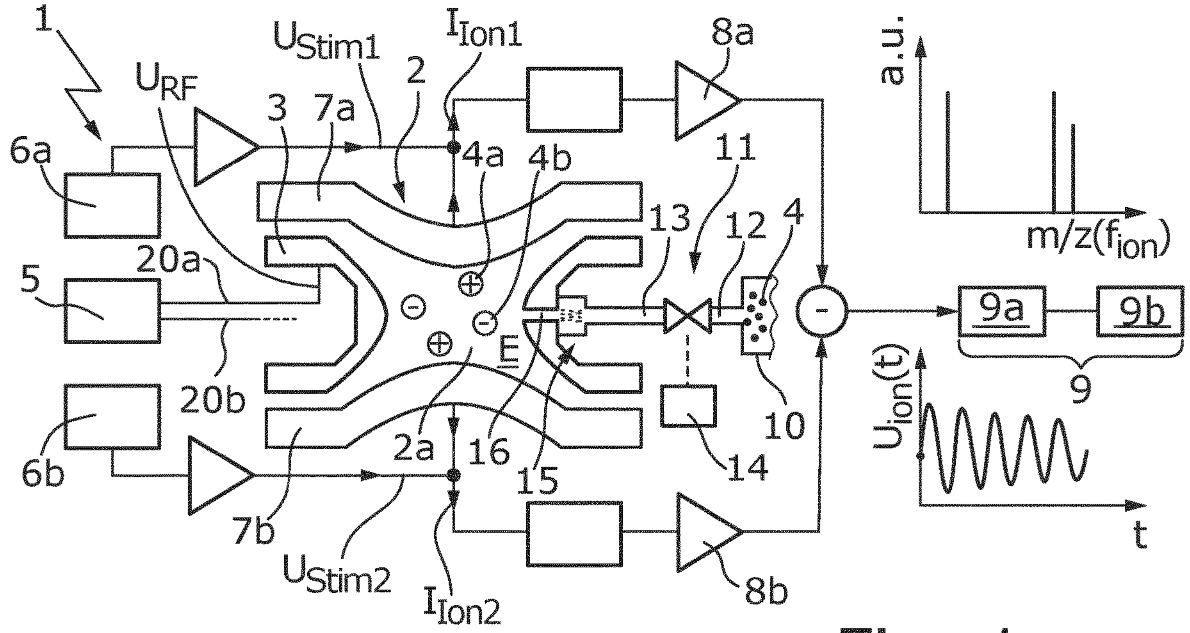
FIG. 1 shows a schematic illustration of a mass spectrometer, which has an ion trap and an ionization device for ionizing a gas which is supplied to the ion trap via a passage opening in an electrode, FIG. 2*a,b* show schematic illustrations of a detail of the mass spectrometer of FIG. 1, in which the electrode has a sharply protruding electrode portion at the passage opening, FIG. 3*a,b* show schematic illustrations analogous to FIGS. 2*a,b*, in which the ionization device is embodied to generate a dielectric barrier discharge or a tip discharge.

FIG. 1 schematically shows a mass spectrometer 1 for examining ions 4*a*, 4*b*, which are stored in an ion trap 2 of the mass spectrometer 1, by mass spectrometry. In the example shown, the ion trap 2 is embodied as an electric ion trap (Paul trap) and has a first electrode in the form of a ring electrode 3. A radiofrequency storage voltage signal in the form of an AC voltage $U_{RF}$ is applied to the ring electrode 3, which signal generates in the ion trap 2 an electric storage field E in the form of a radiofrequency alternating field, in which ions 4*a*, 4*b* of a gas 4 to be analysed are dynamically stored. The mass spectrometer 1 has a storage signal generator 5 for generating the radiofrequency storage voltage signal $U_{RF}$. In the example shown, the storage signal generator 5 is embodied to generate a storage voltage signal $U_{RF}$ at a constant frequency of the order of kHz to MHz, e.g., 1 MHz, and a constant (maximum) amplitude of several hundred volts. Alternatively, the storage signal generator 5 can be embodied to set or change the frequency and/or amplitude of the storage voltage signal $U_{RF}$. To this end, the storage signal generator 5 can be embodied, e.g., as illustrated in WO 2017/194333 A1, cited at the outset.

From the electric storage field E there results an average restoring force that acts on the ions 4*a*, 4*b* to a greater extent, the further away the ions 4*a*, 4*b* are from the middle or centre of the ion trap 2. In order to measure the mass-to-charge ratio (m/z) of the ions 4*a*, 4*b*, the latter are excited by an excitation signal $U_{Stim1}$, $U_{Stim2}$ (stimulus) to oscillate, wherein the frequency of the oscillations depends on the ion mass and the ion charge and is typically in the frequency range of kHz to MHz orders of magnitude, e.g. from approximately 1 kHz to 200 kHz. The respective excitation signal $U_{Stim1}$, $U_{Stim2}$ is generated by a first and a second excitation signal generator 6*a*, 6*b*, downstream of which an amplifier is connected in each case.

For reactionless, non-destructive detection (i.e., the ions 4*a*, 4*b* are still present in the ion trap 2 following the detection), the oscillation signals of the excited ions 4*a*, 4*b* are tapped off in the form of induced mirror charges at two measurement electrodes, which form the cap electrodes 7*a*, 7*b* of the ion trap 2. The two cap electrodes 7*a*, 7*b* are connected to a respective low-noise charge amplifier 8*a*, 8*b* via a respective filter.

The charge amplifiers 8*a*, 8*b* firstly capture and amplify in each case one of two ion currents $I_{Ion1}$, $I_{Ion2}$ that are generated at the cap electrodes 7*a*, 7*b* on account of the excitation, and secondly keep them at virtual earth potential. From the ion currents $I_{Ion1}$, $I_{Ion2}$ converted into voltage signals by the charge amplifiers 8*a*, 8*b*, an ion signal $u_{ion}(t)$ is generated by subtraction, the temporal profile of said ion signal being illustrated at the bottom right in FIG. 1.

The ion signal $u_{ion}(t)$ is supplied to a detector 9, which, in the example shown, has an analogue-to-digital converter 9*a* and a spectrometer 9*b* for fast Fourier analysis (FFT) in order to produce a mass spectrum, which is illustrated at the top right in FIG. 1. In this case, the detector 9 or the spectrometer 9*b* firstly generates a frequency spectrum of the characteristic ion resonant frequencies $f_{ion}$ of the ions 4*a*, 4*b* stored in the ion trap 2, which frequency spectrum is converted into a mass spectrum on the basis of the dependence of the ion resonance frequencies $f_{ion}$ on the mass and charge of the respective ions 4*a*, 4*b*. In the mass spectrum, the number of detected particles or charges in dependence on the mass-to-charge ratio m/z is shown.

In the example shown in FIG. 1, the gas 4 to be analysed is taken from a chamber 10 by means of a gas supply 11, said chamber being a process chamber forming part of an industrial apparatus, in which an industrial process, for example a coating process, is carried out. Alternatively, the chamber 10 can be, e.g., a (vacuum) housing of a lithography apparatus or any other type of chamber. The gas supply 11 has a gas outlet 12 to allow the gas 4 to emerge from the chamber 10, and a valve 13 that is controllable by means of a control device 14 in order to feed the gas 4 to be analysed to an ionization device 15, which ionizes the gas 4 to be analysed, in pulsed fashion. In the example shown in FIG. 1, the ionization device 15 is disposed adjacent to the ring electrode 3. A passage opening 16, through which the ionized gas 4 to be analysed, i.e., the ions 4*a*, 4*b*, is/are introduced into the interior 2*a* of the ion trap 2, is formed in the ring electrode 3. In the example shown, the passage bore 16 extends in a central plane of the ion trap 2, in respect of which the cap electrodes 7*a*, 7*b* and the ring electrode 3 are disposed in mirror symmetric fashion.

In the mass spectrometer 1 shown in FIG. 1, the ionization device 15 is disposed directly adjacent to the ion trap 2, more precisely immediately adjacent to the region of the ring electrode 3, in which the passage opening 16 for the supply of the gas 4 to be analysed is formed. The storage voltage signal $U_{RF}$, which is generated by the storage signal generator 5 and supplied to the ring electrode 3 via a first electric connection line 20*a*, is consequently also available in the ionization device 15 and can be used to generate ions 4*a*, 4*b*, 17 or a plasma, as explained below on the basis of FIGS. 2*a,b*.

Figure 2A:
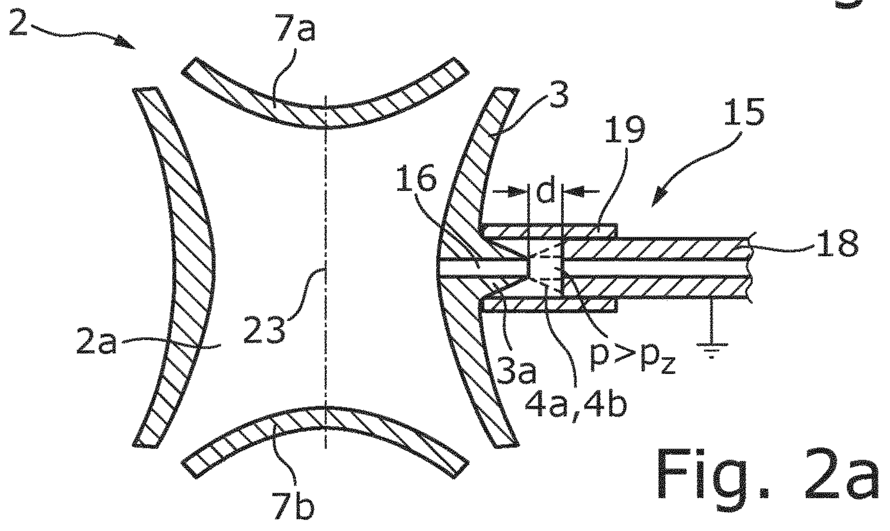

In the ionization device 15 illustrated in FIG. 2*a*, the ring electrode 3 of the ion trap 2, which delimits the interior 2*a*, at the same time forms a first electrode 3 of the ionization device 15 which, together with a second electrode 18, is used to generate ions 4*a*, 4*b* in the space between the two electrodes 3, 18. The fact that the RF storage voltage signal $U_{RF}$, which is applied to the electrode 3, can be used to generate an RF plasma in the gas 4 flowing through the ionization device 15 is exploited. Here, a constant potential (e.g., earth potential) is applied to the second electrode 18.

It is understood that the second electrode 18 need not necessarily be connected to the storage signal generator 5 in order to generate a constant potential at said electrode.

In the ionization device 15 shown in FIG. 2*a*, the second electrode is embodied as a metallic supply line 18, through which the gas 4 to be analysed flows in the direction of the ion trap 2. On its outer side facing away from the interior 2*a*, the ring electrode 3 has a tubular electrode portion 3*a*, which tapers to a tip and surrounds the passage opening 16 or extends the latter in the direction of the second electrode 18. The second electrode 18 is disposed at a predetermined distance d from the end of the electrode portion 3*a* which tapers to a tip. In order to bridge the interstice between the ring electrode 3 or the electrode portion 3*a* which tapers to a tip and the end of the supply line, which is used as second electrode 18, the ionization device 15 has a tubular supply line portion 19, which consists of an electrically insulating material, a ceramic in the example shown. The electrically insulating supply line portion 19 extends along the outer side of the supply line 18 which forms the second electrode and bridges the interstice between the end thereof facing the ring electrode 3 and the ring electrode 3. The supply line portion 19 prevents the gas 4 to be analysed from being able to escape to the surroundings.

An ignition path is available for igniting a plasma or for generating ions 4*a*, 4*b* in the space between the two electrodes 3, 18, said ignition path corresponding to the distance d between the two electrodes 3, 18 in the flow direction of the gas 4 to be analysed and being able to have a length of between approximately 100 μm and 50 mm, for example.

Since the control device 14 must drive the controllable valve 13 in any case in order to supply the gas 4 to be analysed to the interior 2*a* of the ion trap 2 in pulsed fashion, the plasma is automatically ignited in the case of a suitable choice of the parameters of the pulsed supply of the gas 4 to be analysed and said plasma is quenched again when the gas pressure drops, without this requiring closed-loop control. Quenching the plasma while storing and analysing the ions 4*a*, 4*b*, which were supplied in pulsed fashion, in the ion trap 2 is advantageous for avoiding interference in the electric storage field E in the ion trap 2 by the plasma, for example for minimizing space charging effects.

Figure 2B:
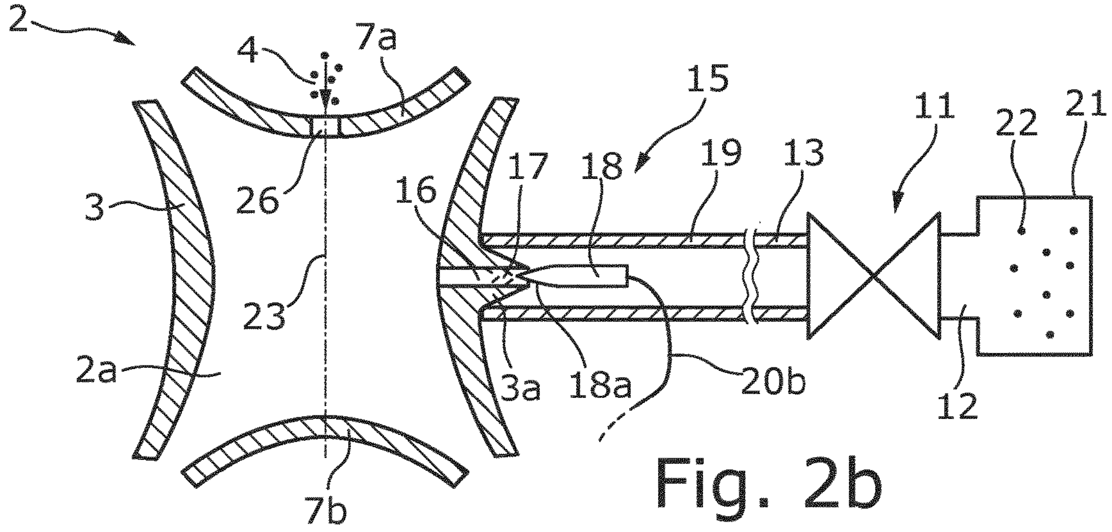

The ionization device 15 shown in FIG. 2*b* substantially differs from the ionization device 15 shown in FIG. 2*a* in that the former has a supply line 19 made of an electrically insulating material, in which the second electrode 18 is disposed. In the example shown in FIG. 2*b*, the second electrode 18 has an end 18*a*, which tapers to a tip and which protrudes into the passage opening 16 of the ring electrode 3 at the protruding electrode portion 3*a*. In this way, it is possible to generate the ions 17 in the passage opening 16, directly adjacent to the interior 2*a* of the ion trap 2.

In the example shown in FIG. 2*b*, the gas to be ionized and to be supplied to the interior 2*a* of the ion trap 2 is an ionization gas 22, typically a noble gas, for example helium. The ionization gas 22 is kept in a gas reservoir 21 of the gas supply 11 and supplied to the supply line 19 of the ionization device 15 via a gas outlet 12 and the controllable valve 13. The ionization gas 22 is used to ionize a gas 4 to be analysed in the interior 2*a* of the ion trap 2. In this case, the gas 4 to be analysed is introduced into the interior 2*a* of the ion trap 2 through a passage opening 26 in the first cap electrode 7*a* and aligned approximately on the centre of the ion trap 2. The ion trap 2 has an axis of symmetry 23, in respect of which the electrodes 3, 7*a*, 7*b* of the ion trap 2, more precisely the inner sides thereof which delimit the interior 2*a*, have rotational symmetry. The gas 4 to be analysed is ionized by way of impact and/or charge exchange ionization in the interior 2*a* of the ion trap 2 by means of the ions 17 of the ionization gas 22 generated in the ionization device 15. The number of impacts between the gas 4 to be analysed or the ions 4*a*, 4*b* of the gas 4 to be analysed and the ions 17 of the ionization gas 22 can be increased in targeted fashion if the ions 17 of the ionization gas 22 are stored in the storage field E of the ion trap 2 or at least forced into comparatively long trajectories. The use of neon or argon as ionization gas 22 is advantageous to this end.

Should—unlike what is illustrated in FIG. 2*b*—the gas 4 to be analysed be ionized outside of the ion trap 2, i.e., should the use of an ionization gas 22 be dispensed with, the gas 4 to be analysed, which enters into the interior 2*a* of the ion trap 2 through the first cap electrode 7*a*, can likewise be ionized with the aid of a (plasma) ionization device 15, which may be constructed as illustrated in FIG. 2*a*, for example. In this case, the first cap electrode 7*a* and not the ring electrode 3 forms part of the ionization device 15. In this case, the excitation voltage signal $U_{Stim1}$ generated by the first excitation signal generator 6*a* is used to generate a plasma 17 in the plasma generating device 15. It is understood that the second cap electrode 7*b* or the second excitation signal generator 6*b* can be used accordingly in order to ionize the gas 4 to be analysed or the ionization gas 22.

Figure 3A:
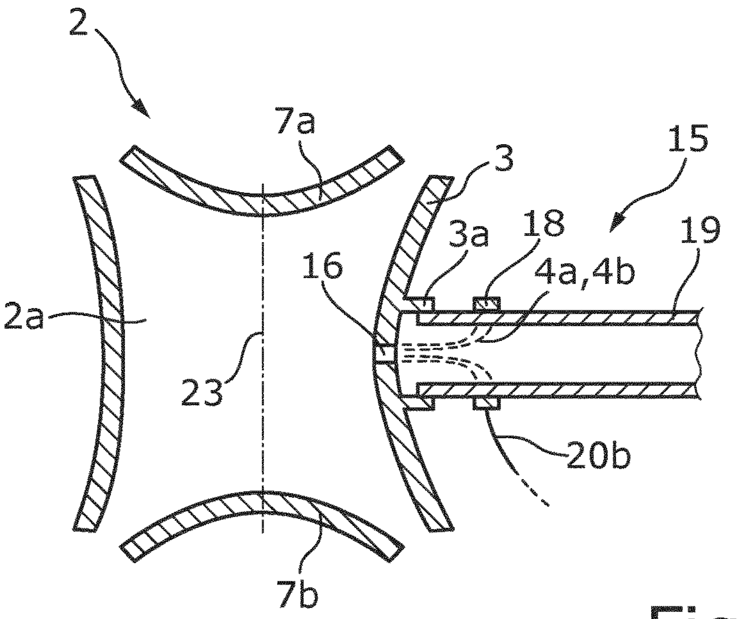

FIGS. 3*a,b* show two further options for generating ions 4*a*, 4*b* or a plasma in the (plasma) ionization device 15, which differ from the examples shown in FIGS. 2*a,b* by the configuration of the second electrode 18.

In the example shown in FIG. 3*a*, the supply line 19, like in FIG. 2*b*, is formed from an electrically insulating material. A ring-shaped, metallic cuff 18 (or a pipe portion) is attached to the outer side of the supply line 19 and forms the second electrode of the ionization device 15. Since the second electrode or the cuff 18 is shielded by the supply line 19, the plasma 17 is generated within the supply line 19 in a region directly adjacent to the ring electrode 3 by way of a dielectric barrier discharge.

Figure 3B:
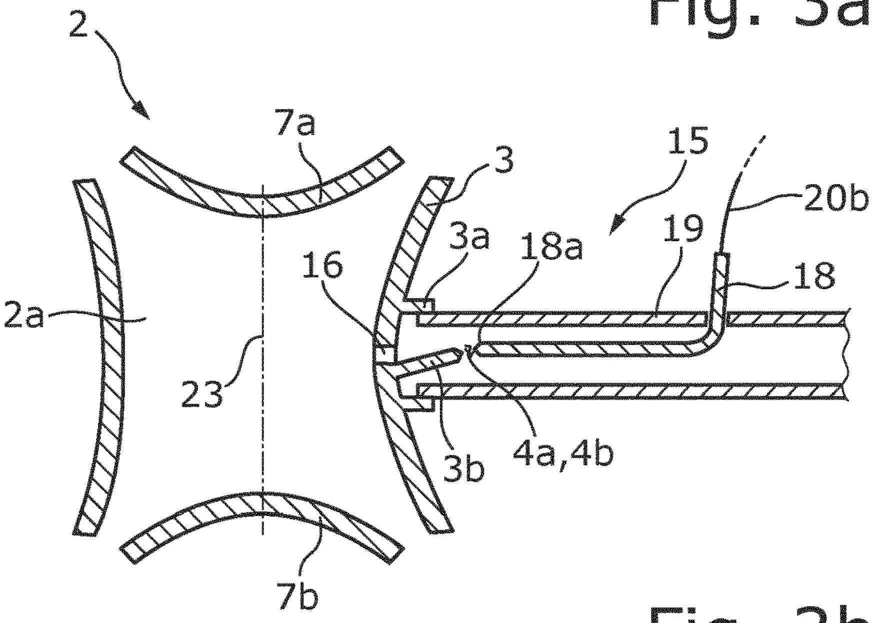
Figure 4:
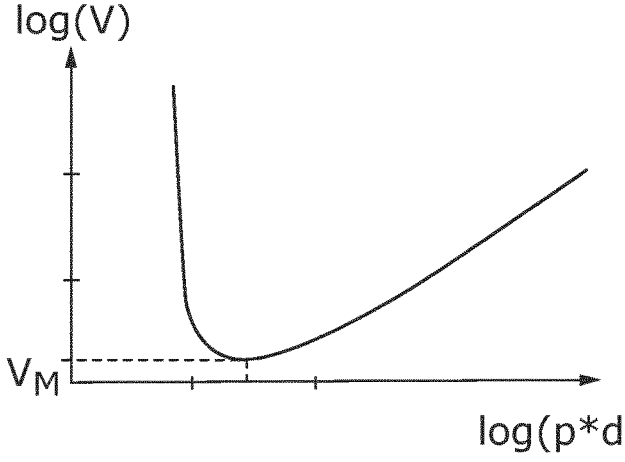
FIG. 4 shows an illustration of the Paschen curve of the ignition voltage of a plasma as a function of the product of gas pressure and electrode spacing.

In the example shown in FIG. 3*b*, the second electrode 18 is disposed within the electrically insulating supply line 19, like in the example shown in FIG. 2*b*. The second electrode 18 has a rod-shaped embodiment and also has a tip 18*a*, which faces the ring electrode 3 or the passage opening 16. In addition to a first protruding, cylindrical electrode portion 3*a*, which is used like in FIG. 3*a* for receiving or fastening the cylindrical supply line 19, a second protruding electrode portion 3*b* which tapers to a tip is formed on the ring electrode 3. The second electrode portion 3*b* is attached to the outer side of the ring electrode 3 with a lateral offset from the passage opening 16 and, with its end which tapers to a tip, extends in the direction of the tip 18*a* of the second electrode 18 in order to generate ions 4*a*, 4*b* or a plasma in an interstice to the tip 18*a* of the second electrode 18.

In summary, the voltage signal(s) or potential(s) applied to the electrodes 3, 7*a*, 7*b* of the ion trap 2 can be used to generate ions 4*a*, 4*b*, 17 or a plasma in the region of the inlet of the gas 4 to be analysed or of the ionization gas 22 into the interior 2*a* of the ion trap 2 in the manner described above, i.e., by the specific geometry of the electrode 3 or a suitable embodiment of the ionization device 15. Since the electrodes 3, 7*a*, 7*b* are supplied with a respective voltage signal $U_{RF}$, $U_{Stim1}$, $U_{Stim2}$ by the signal generators 5, 6*a*, 6*b*, no additional voltage supply is required for the ionization device 15. Moreover, the respective electrode 3, 7*a*, 7*b* could be used as a (first) electrode of the ionization device 15, where appropriate.

It is understood that the procedure described above can be advantageously applied not only in the mass spectrometer 1 with an ion trap 2 in the form of an electric resonance trap, as shown in FIG. 1, but also to different types of ion traps 2. The voltage signal which is used to generate the ions 4*a*, 4, 17 or the plasma could, where applicable, be not a (radiofrequency) AC voltage but a DC voltage in this case.

Nor is it mandatory to carry out a non-destructive analysis of the ions 4*a*, 4*b* stored in the ion trap 2, as is the case in the mass spectrometer 1 illustrated in FIG. 1. Rather, the ions 4*a*, 4*b* or, in targeted fashion, individual ion species could be removed from the ion trap 2 for detection purposes. In this case, the ions 4*a*, 4*b* removed from the ion trap 2 are detected in a detector 9 which is disposed outside of the ion trap 2.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A mass spectrometer, comprising:

an ion trap, which has an interior for storing ions, a signal generator configured to generate a radio frequency voltage signal, and a plasma ionization device, characterized in that an electrode that forms part of both the ion trap and the ionization device is connected to the signal generator and is configured to receive the radio frequency voltage signal such that the radio frequency voltage signal causes the ionization device to generate ions that are provided to the ion trap while the radio frequency voltage signal also causes the ion trap to store ions in the interior of the ion trap.

2. The mass spectrometer according to claim 1, wherein the electrode connected to the signal generator has a passage opening for the supply of the gas from the ionization device into the interior.

3. The mass spectrometer according to claim 1, further comprising: a gas supply, which is embodied to supply a gas in the form of a gas to be analysed or an ionization gas to the ionization device.

4. The mass spectrometer according to claim 3, wherein the gas supply has at least one valve, which is controllable by means of a control device, for the pulsed supply of the gas to the ionization device.

5. The mass spectrometer according to claim 1, wherein the electrode connected to the signal generator forms a first of at least two electrodes of the ionization device, between which the ions are generated.

6. The mass spectrometer according to claim 5, wherein the electrode-connected to the signal generator has a tubular electrode portion that tapers to a tip, on its side facing away from the interior.

7. The mass spectrometer according to claim 5, wherein the ionization device has an electrically conductive supply line, which is intended for supplying the gas to the ion trap and which forms the second of the at least two electrodes of the ionization device.

8. The mass spectrometer according to claim 5, wherein the ionization device has a supply line made of an electrically insulating material for supplying the gas to the ion trap and wherein the second electrode of the at least two electrodes of the ionization device is arranged on the outer side of the supply line.

9. The mass spectrometer according to claim 5, wherein the ionization device has a supply line made of an electrically insulating material and wherein the second electrode of the at least two electrodes of the ionization device is arranged within the supply line.

10. The mass spectrometer according to claim 9, wherein the second electrode of the ionization device has a tip that faces the first electrode of the ionization device.

11. The mass spectrometer according to claim 1, wherein the electrode connected to the signal generator comprises a ring electrode of the ion trap for storing the ions in the interior.

12. The mass spectrometer according to claim 1, wherein the electrode connected to the signal generator comprises a cap electrode of the ion trap for exciting the ions in the interior.

13. The mass spectrometer according to claim 1, further comprising: a detector for detecting ions removed from the ion trap or an ion signal generated by the ions stored in the ion trap.

* * * * *